Patented Nov. 28, 1944

2,363,832

UNITED STATES PATENT OFFICE 2,363,832

PRODUCTION OF MOLDED GELS

Gerald C. Connolly, Baton Rouge, La., assignor to Standard Oil Development Company, a corporation of Delaware No Drawing. Application December 27, 1940, Serial No. 372,018

7 Claims. (Cl. 252—259)

This invention relates to the preparation of molded gel products and pertains more particularly to a method of plasticizing gelatinous masses preparatory to forming said masses into molded products suitable for catalysts and the like.

It has heretofore been proposed to prepare gel-type catalysts and the like by first forming a hydrous gelatinous oxide such as hydrogel and then subjecting this product to a stirring, kneading and mixing treatment. During the course of this treatment, the gelatinous material is converted into a paste suitable for extruding or otherwise molding into units of uniform size and shape. The resulting products can be used, for example, in catalytic operations in which the products to be reacted pass through a reaction zone containing the catalyst units.

In many cases additional catalytic constituents are incorporated into the catalyst units by adding said constituents to the gelatinous material prior to or during the mixing or kneading operation. For example, in the preparation of silica-magnesia catalysts suitable for cracking hydrocarbon oils, it is a practice to combine the magnesia with the silica while the latter is in a hydrogel state by homogenizing or otherwise intimately mixing the two ingredients. This mixing treatment had been used according to prior practices by conventional kneading machines, such as "Chilean mills," "Simpson mixers," ball mills, and the like, in which the product is subjected to a pressing, kneading and stirring process.

It has been found that in many cases this method of plasticizing the product results in a product having a low mechanical strength so that excessive losses occur due to breakage of the catalyst pellets. Also this method has the serious drawback of being time-consuming in that a long period of time, usually an hour or more, is required to be assured of even a fairly uniform mix. This is a serious disadvantage from an economic viewpoint, necessitating large and duplicate units with increased operating costs.

I have found that catalyst pellets or other units of high mechanical strength can be quickly and economically obtained by subjecting the gelatinous mass prior to the molding treatment to a continuous shearing or tearing action rather than to rubbing, working or kneading action accomplished by the types of mixing machines heretofore used.

This shearing or tearing action can be accomplished, for example, by the use of the principle of a colloid mill in which the material is forced through a clearance between a high-speed rotor and a stationary stator, or between two discs rotating rapidly in opposite directions. This type of machine works on the principle of a hydraulic shearing action produced in a very thin film of liquid. The presence of a liquid is essential to the operation. As the liquid is drawn into and spread out in the narrow spaces between the high-speed rotor and the stationary stator or between the rotating discs, it becomes subjected to tremendous shearing forces. Particles present in this liquid film will be dispersed into particles of microscopic dimensions.

While the invention in its broader phases has a general application, it is particularly adapted for the preparation of silica-magnesia catalysts of the type previously described. This catalyst when plasticized according to methods heretofore employed was found to result in a product of low mechanical strength, but by the use of a colloid mill or other type of machine employing a shearing or tearing action a product of high mechanical strength resulted.

The product following the plasticizing treatment may be extruded directly into units of uniform size and shape and thereafter dried and activated.

Other carriers than the hydrous oxide of silica may be used, for example, hydrous oxides of $Al_2O_3$, titania, stannia, etc. Other materials may be added to the silica hydrogel in the place of the magnesia, for example, dried gels or hydrous oxide jellies of $Al_2O_3$, $TiO_2$, $Cr_2O_3$, suitable metal or metal oxides, particularly those having catalytic properties as $Al_2O_3$, $TiO_2$, $Cr_2O_3$, $V_2O_5$, $MoO_3$, $WO_3$, and $ZrO_2$. Clays or similar natural products may be incorporated for diluent or (and) added catalytic properties.

Having described the preferred embodiment of the invention, it will be understood that it embraces such other variations and modifications as come within the spirit and scope thereof.

I claim:

1. A method of plasticizing synthetic inorganic gelatinous materials to form a plastic product suitable for molding which comprises subjecting said gelatinous material to a shearing or tearing treatment to thereby convert said gelatinous material into a plastic mixture suitable for molding.

2. The method defined in claim 1 wherein the gelatinous mass is a hydrous oxide of silicon.

3. The method defined in claim 1 wherein the gelatinous mass is a hydrous oxide of silicon containing one or more components.

4. The method defined in claim 1 wherein the gelatinous mass is a hydrous oxide of silicon containing an active catalytic agent.

5. The method defined in claim 1 wherein the gelatinous mass is a hydrous oxide of silicon containing a metal oxide.

6. The method defined in claim 1 wherein the gelatinous mass is a silica hydrogel to which magnesia is added.

7. A method of producing molded synthetic gel catalysts which comprises first forming a metal oxide hydrogel, combining an active catalytic agent with said hydrogel, thereafter subjecting said hydrogel to shearing and tearing treatment to improve the plastic characteristics of said gel and thereafter molding the resulting plastic mixture to form a final product.

GERALD C. CONNOLLY.